United States Patent [19]

Aihara et al.

[11] Patent Number: 4,924,249
[45] Date of Patent: May 8, 1990

[54] POWER SUPPLY DEVICE FOR CAMERA

[75] Inventors: Yoshihiko Aihara; Mutsuhide Matsuda, both of Yokohama, Japan

[73] Assignee: Canon Kabushiki Kaisha, Tokyo, Japan

[21] Appl. No.: 406,876

[22] Filed: Sep. 13, 1989

Related U.S. Application Data

[63] Continuation of Ser. No. 136,976, Dec. 23, 1987, abandoned.

[30] Foreign Application Priority Data

Dec. 27, 1986 [JP] Japan .................................. 61-312676
Dec. 27, 1986 [JP] Japan .................................. 61-312680

[51] Int. Cl.$^5$ ............................................ G03B 17/14
[52] U.S. Cl. ...................................... 354/286; 354/400
[58] Field of Search ...................... 354/286, 195.1, 400

[56] References Cited

U.S. PATENT DOCUMENTS

| 4,457,609 | 3/1984 | Tomino et al. | 354/286 |
| 4,464,034 | 8/1984 | Tomino | 354/286 |
| 4,472,040 | 9/1984 | Kawabata | 354/406 |

OTHER PUBLICATIONS

Phot Argus, pp. 15, 16, 19, 22, 24, 25, 31, 32, Nov. 1977, vol. No. 83.

*Primary Examiner*—Michael L. Gellner
*Attorney, Agent, or Firm*—Fitzpatrick, Cella, Harper & Scinto

[57] ABSTRACT

A power supply device in a camera system having an accessory arranged to be mountable and dismountable on and from a camera body which includes a power source. The camera body includes an electronic circuit arranged to communicate with the accessory by a first connection terminal arranged to permit a first power supply to the accessory, a second connection terminal arranged to permit a second power supply to the accessory, a third connection terminal arranged to permit communication with the accessory, and a detector for detecting mounting of the accessory on the camera body. The accessory includes a motor drive for the camera; an electronic circuit arranged to communicate with the camera body; a first connection terminal arranged to be connected to the first connection terminal on the camera body side to connect the first power supply to the electronic circuit of the accessory; and a second connection terminal arranged to be connected to the second connection terminal of the camera body to connect the second power supply to the motor. The first and second connection terminals are set in positions which correspond to the positions of the first and second connection terminals of the camera body and deviate from each other almost perpendicularly with respect to a direction in which the accessory is to be moved in mounting it on the camera body.

41 Claims, 6 Drawing Sheets

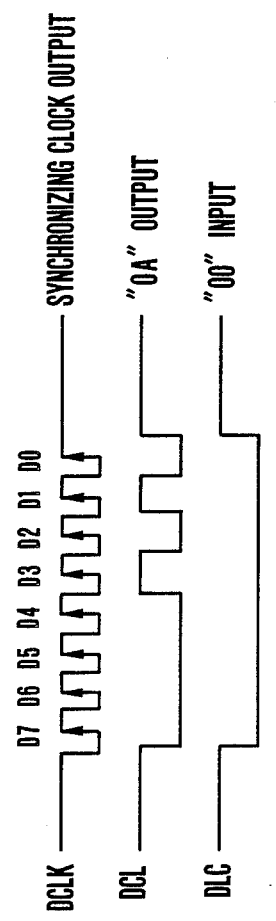
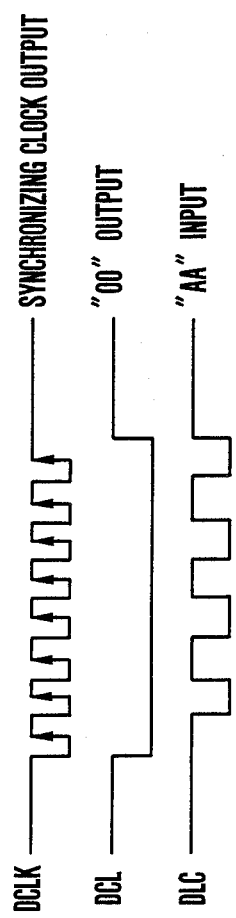

POWER SUPPLY DEVICE FOR CAMERA

This application is a continuation of application Ser. No. 136,976 filed Dec. 23, 1987, now abandoned.

BACKGROUND OF THE INVENTION

1. Field of the Invention

This invention relates to a power supply device for a camera of the kind using an interchangeable lens or the like and more particularly to a power supply device to be used for a power supply to an accessory such as an interchangeable lens as well as for a power supply to a camera body.

2. Description of the Related Art

As a result of the recent advancement of camera automation, cameras are equipped with an automatic exposure control device, automatic focusing device, an automatic light amount control device, etc. For these devices, various electronic circuits, a motor and a battery are arranged within the camera. In the case of lens interchangeable type cameras which are provided with these devices, they have motors and electronic circuits arranged not only on the side of their camera bodies but also on the side of their lenses. Therefore, the camera of this kind is provided with a connector which is disposed at mount parts for coupling the camera body and the lens with each other and has electric contacts or connection terminals arranged to electrically connect various devices disposed within the camera body to those disposed within the lens.

These connection terminals include terminals for receiving a power supply and terminals for signal exchange. The power supply terminals includes terminals of two different kinds, one for receiving a positive power supply and the other for receiving a negative power supply. With respect to the power supply on the negative side, some electric connection part that is other than an electronic contact, such as the mount, can be employed. As for the power supply on the positive side, two power supply channels are generally arranged, one for operating an actuator such as the motor and the other for operating electronic circuits for control and information exchanges. Terminals are discretely arranged for these two channels. However, in the event of inadequate contact between contact points or during the process of mounting the lens on the camera body, the power supply is either not received or only intermittently received by the control circuits while the actuators are receiving the power supply. Under such a condition, a faulty action might be performed with the motor driven by the power supply. In other words, while the motor is rendered operative by the power supply, the control circuits are not receiving any power supply. Then, a normal operation of the motor is hardly expectable because of the unreliability of control signals.

Further, in cases where the motor power supply is alone effected while the communication lines of the electronic circuit on the side of the camera body is not completely in touch with the communication lines on the side of the lens due to inadequate contact between contact points or during the lens mounting process, the electronic control circuit on the side of the lens fails to correctly receive information from the camera body. As a result, an instruction for forward rotation of the motor might be mistaken for reverse rotation; or an instruction for a halt might be unreceived. A normal operation is not assurable also under such a condition. A conductive foreign matter such as conductive dust or water sticking to a communication line causes a short-circuit state between the communication line and the mount part or between adjacent connection terminals. In that case, the electronic control circuit on the side of the lens also fails to correctly receive information from the camera body. Then, a normal operation is likewise not assurable.

In the conventional lens interchangeable type camera, the number of connection terminals is reduced by using a ground line and its connection terminal for the motor on the side of the lens in common with a ground line and its connection terminal for the electronic control circuit which is also on the lens side. The common use of the ground line and the connection terminal, however, tends to break both the electronic circuits disposed on the sides of the camera body and the lens due to a difference in ground potential between the lens and the camera body. For example, assuming that the ground potential of the electronic circuit on the side of the camera body is at zero volt, that of the electronic circuit on the side of the lens is one volt (with 1 A of ground current flowing at contact resistance 1 Ω of the terminal), when a signal of a high level of 5 V and a low level of 0 V is applied from the electronic circuit on the camera body side to the electronic circuit on the lens side, the electronic circuit on the lens side is receiving a voltage which is lower than the ground potential by 1 V. This would cause either a faulty action or thermal breakage of the electronic circuit on the lens side. To solve this problem, an improved interchangeable lens has been proposed as disclosed in U.S. Patent Application Ser. No. 012,862, filed Feb. 10, 1987, assigned to the assignee of the present invention. The interchangeable lens disclosed in the previous application, however, has been found to have the probability of making some erroneous connection during the process of mounting the interchangeable lens on a camera body, because: The connection terminals on the sides of both the camera body and the lens have flat contact faces and are arranged to protrude to the same extent and to have the same pitch between them.

SUMMARY OF THE INVENTION

It is an object of this invention to provide a power supply device for a camera which is arranged to prevent a faulty action by effecting a power supply from a camera body to an accessory after confirmation of perfect connection of communication lines.

It is another object of the invention to provide a power supply device which is capable of preventing electronic circuits from breaking during a process of mounting an accessory on a camera body in a camera system, wherein a connector is arranged to interconnect an electronic circuit of the camera body and that of the accessory by bringing their connection terminals into contact with each other for continuity when the camera body and the accessory are coupled with each other by turning the latter round relative to the former.

These and further objects and features of the invention will become apparent from the following detailed description of embodiments thereof taken in connection with the accompanying drawings.

BRIEF DESCRIPTION OF THE DRAWINGS

FIGS. 3 and 4 are timing charts.

DETAILED DESCRIPTION OF THE PREFERRED EMBODIMENTS

Figure 1:
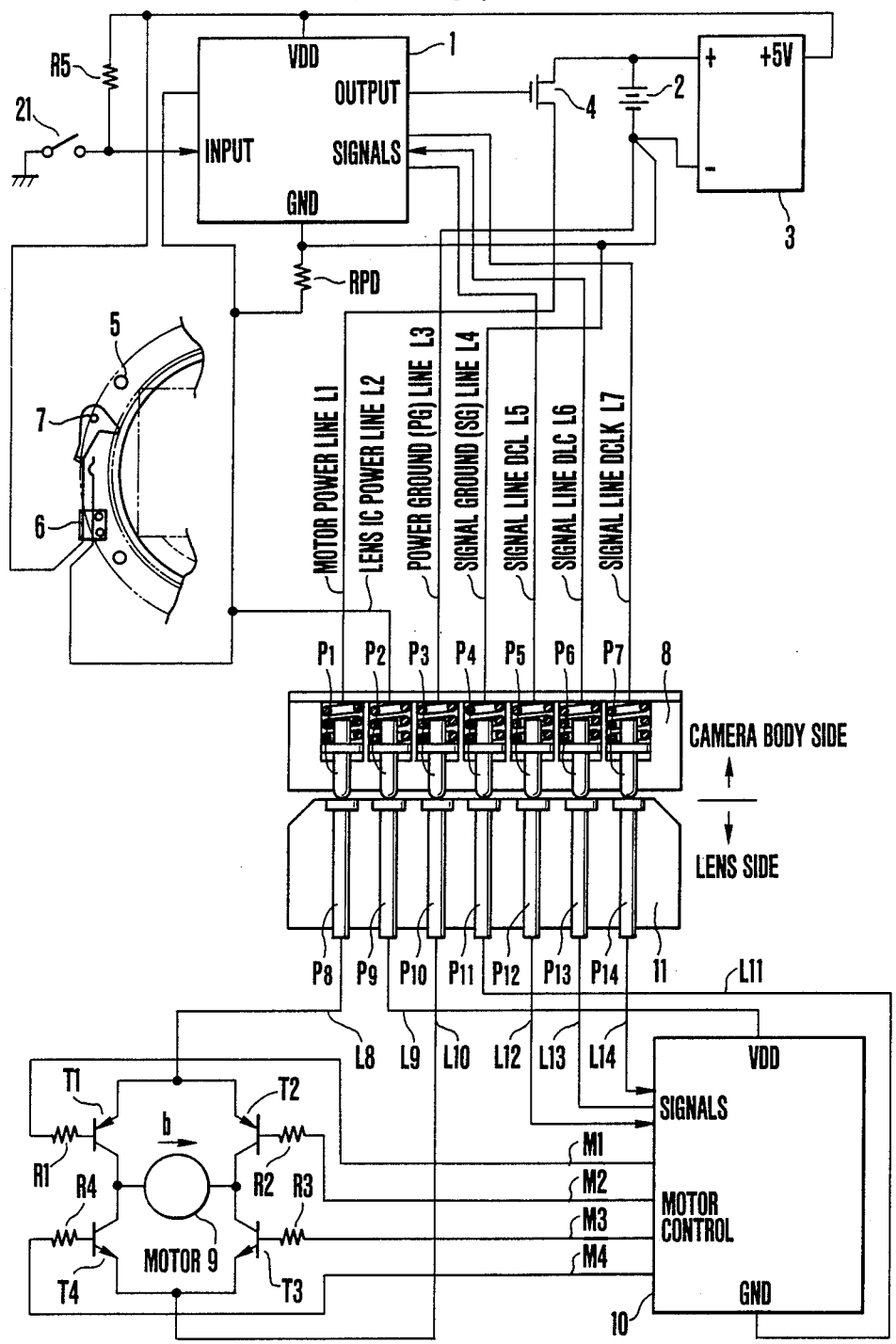
FIG. 1 is a diagram showing in outline an electric connection arrangement made between a camera body and an interchangeable lens according to this invention as a first embodiment thereof.

A first embodiment of this invention is described with reference to the accompanying drawings as follows: In FIG. 1, an electronic circuit 1 is disposed within a camera body. A power source 2 which is a battery or the like is removably disposed within the camera body. A constant voltage producing circuit 3 is arranged to have a power supply from the power source 2 and is arranged to serve as a power source for the electronic circuit 1 and another electronic circuit 10 which is disposed on the side of a lens. A motor 9 is disposed on the side of the lens. An analog switch 4 is arranged to turn on and off a power supply to the motor 9. A lens mounting mount 5 is provided on the camera body. A lens mounting detection switch 6 is provided on an input signal line of the electronic circuit 1 and is disposed near the lens mounting mount 5. A lens mounting-dismounting responsive member 7 is arranged to operate the lens mounting detection switch 6. The member 7 is a swingable member pivotally attached to the reverse side of the lens mounting mount 5 and is provided with two arm parts which are located on two sides of a pivotal point. One of the arm parts engages a part of the mount 5 and is arranged to be driven thereby. The other arm part is arranged to push one of two switch pieces of the lens mounting detection switch 6.

The two switch pieces of the lens mounting detection switch 6 are in a parted state when the lens is not mounted on the camera body. When the lens is mounted on the camera body, the two switch pieces come into contact with each other to connect the input terminal of the electronic circuit 1 to the output terminal of the constant voltage producing circuit 3.

A terminal block 8 for wiring connection is disposed in a lower inner circumferential area of the lens mounting mount 5. Many connection terminals or contact pins P1 to P7 are arranged on the connection terminal block 8 to abut on connection terminals or electric contacts which are disposed on the side of the lens. Each of these connection terminals P1 to P7 is urged by a spring to protrude forward from the front face of the terminal block 8. Further, wiring lines L1 to L7 which are arranged on a printed circuit board attached to the camera body are discretely connected to these connection terminals P1 to P7.

The line L1 which is connected to the connection terminal P1 serves as a motor power line for a power supply from the power source 2 disposed within the camera body to the motor 9 disposed within the lens. The above stated analog switch 4 is disposed on this line L1. The line L2 which is connected to the connection terminal P2 is a lens IC power line and connects the lens mounting detection switch 6 to the input terminal of the electronic circuit 1. The line L3 which is connected to the connection terminal P3 is a power ground line and is connected to the negative plate of the power source 2. The line L4 which is connected to the connection terminal P4 is arranged to be connected to the ground line of the electronic circuit 10 on the lens side and is connected to the ground terminal of the electronic circuit 1 on the camera body side and to the negative plate of the power source 2. The lines L5 to L7 which are connected to the terminals P5 to P7 are signal lines arranged to permit an exchange of signals between the electronic circuit 1 on the camera body side and the electronic circuit 10 on the lens side. These lines L5 to L7 are connected to the signal terminals of the electronic circuit 1.

The interchangeable lens is detachably mountable on the camera body which is arranged as described in the foregoing. The lens is provided with the focusing drive motor 9; a static switch device which is arranged to switch the direction of the power supply to the motor 9 from one direction over to another; the electronic circuit 10 which is arranged to control the motor 9 and to exchange signals with the electronic circuit 1 on the camera body side; a mount which is not shown but is arranged on the lens side to be detachably attached to the lens mounting mount 5 disposed on the camera body side; and a connection terminal block 11 which is disposed in a lower inner circumferential area of the mount on the lens side and is arranged to be opposed to the connection terminal block 8 which is disposed on the side of the camera body.

Seven connection terminals or contact pins P8 to P14 are arranged on the connection terminal block 11 on the lens side to come into contact with the connection terminals P1 to P7 which are disposed on the camera body side as shown in the drawing. Wiring lines L8 to L14 are discretely connected to these connection terminals P8 to P14 respectively.

The lines L8 and L10 are connected to the motor 9 via a static switch which will be described later and are arranged as power lines to permit larger current flows than other lines L9 and L11 to L14. The line L8 is a motor power line. The line 10 is a power ground line for grounding one of the poles of the motor 9. The line L9 which is connected to the connection terminal P9 is a power line for supplying a current to the electronic circuit 10 on the side of the lens. The line L9 is connected to the power supply terminal of the circuit 10 and is arranged to be connected to the line L2 on the camera body side via the connection terminals P9 and P2.

The line L11 is connected to the ground terminal of the electronic circuit 10 and is also arranged to be connected to the line L4 of the camera body via the connection terminals P11 and P4. The line L11 thus serves as a signal ground line for the circuit 10 on the lens side. The lines L12 to L14 are connected to the signal terminals of the electronic circuit 10 and to the connection terminals P12 to P14 respectively. These lines L12 to L14 are also arranged to be connected respectively to the lines L5 to L7 of the camera body via the connection terminals P12 to P14 on the side of the lens and the connection terminals P5 to P7 on the camera body side. The lines L12 to L14 thus serve as signal lines.

Data transmitted from the electronic circuit 1 is received by the electronic circuit 10 via the line L5, connection terminals P5 and P12 and the line L12. Data from the electronic circuit 10 is received by the circuit 1 via the line L13, the connection terminals P13 and P6 and the line L6. Further, clock pulses which are produced for synchronizing serial signal transmission are sent from the electronic circuit 1 to the circuit 10 via the line L7, the connection terminals P7 and P14 and the line L14.

The static switch device which is arranged to change the direction of a current supply to the motor 9 is composed of a total of four transistors T1 to T4. These transistors are arranged in two pairs, each pair consisting of one NPN transistor and one PNP transistor. One pair of transistors is connected to one pole of the motor 9 and the other pair to the other pole. The emitters of the PNP transistors T1 and T2 of these pairs are connected to the line L8 disposed on the side of the lens. The line L8 is arranged to be connected to the line L1 of the camera body via the connection terminal P8 on the connection terminal block 11. In other words, the line L8 forms a power line for supplying electric energy to the motor in conjunction with the line L1.

One pole of the motor 9 is connected to the collectors of the paired PNP and NPN transistors T1 and T4. The other pole of the motor 9 is connected to the collectors of another pair of the PNP and NPN transistors T2 and T3. Meanwhile, the emitters of the NPN transistors T3 and T4 which belong to different pairs are connected to the line L10. The line L10 serves as a power ground line on the side of the lens. The line L10 is arranged to connect the negative pole of the motor 9 to the connection terminal P3 on the camera body side via the connection terminal P10 and also to be connected to the negative plate of the power source 2 via the line L3 on the side of the camera body.

The electronic circuit 10 is provided with control terminals for controlling the transistors T1 to T4 of the static switch device. Signal lines M1 to M4 are arranged to connect the bases of the transistors T1 to T4 to these control terminals of the circuit 10 Reference symbols R1 to R4 denote resistors.

A switch 21 is arranged, for example, to be turned on by the first step of stroke of a shutter button which is not shown. The camera performs a light measuring action when the shutter button is pushed to the first step of stroke. Then a shutter time value and an aperture value are displayed on an external display device which is not shown. While FIG. 1 shows the switch 21 alone, the switch may be replaced with a plurality of switches in the case of the camera of the recently proposed kind displaying the shutter time and aperture values with a liquid crystal display device. In the case of the camera of that kind, to better the operability of the camera, the liquid crystal display device is arranged to be displayed when an operation member is operated to turn on a switch instead of pushing the shutter button to the first step of stroke. A reference symbol R5 denotes a pull-up resistor which is connected to the switch 21.

The following paragraphs briefly describe the operations of various components shown in the drawing:

(1) When the lens is not mounted on the camera body:

The connection terminal block 11 which is disposed on the side of the lens is away from the connection terminal block 8 which is disposed on the side of the camera body. Therefore, the connection terminals P1 to P7 of one block are not contacting with the terminals P8 to P14 of the other block. Further, the lens mounting detection switch 6 which is disposed on the lens mounting mount 5 of the camera body has its two switch pieces in a parted state as shown in FIG. 1. Therefore, the input terminal of the electronic circuit 1 is connected to the negative plate of the power source 2 via a reducing resistor RPD. The input terminal is under a voltage of a low level close to the ground voltage. This state causes a high level voltage which turns off (or opens) the analog switch 4 to be produced from the output terminal of the circuit 10. The analog switch 4 is, therefore, in an open (off) state to disconnect the connection terminal P1 from the power source 2.

(2) When the lens is mounted on the camera body:

In mounting the lens on the camera body, the mount on the side of the lens is turned round clockwise as viewed on the drawing against the lens mounting mount 5 of the camera body. Then, the mount on the side of the lens causes the lens mounting-dismounting responsive member 7 to turn round counterclockwise on its pivot point. One of the arm parts of the member 7 pushes one of the switch pieces of the lens mounting detection switch 6 to the left as viewed on the drawing. The two switch pieces of the switch 6 come into contact with each other to turn on the switch 6. Therefore, the 5-V output terminal of the constant voltage producing circuit 3 is thus connected to the input terminal of the electronic circuit 1 via the switch 6. As a result, a high level (5 V) voltage is applied to the input terminal of the circuit 1. This causes the output voltage level of the circuit 1 to change from a high level over to a low level.

When the lens is completely mounted on the camera body via the lens mounting mount 5 thereof, the connection terminals P1 to P7 on the camera body side come into contact with the connection terminals P8 to P14 on the lens side as shown in the drawing. Therefore, the wiring lines L1 to L7 on the side of the camera body are connected to the lines L8 to L14 via the connection terminals P1 to P14 to complete the wiring connection as shown in FIG. 1. In FIG. 1, the lens mounting detection switch 6 is shown as in an open state having its two switch pieces away from each other. However, the switch 6 is kept in a closed state after the lens is completely mounted.

The communication between the lens and the camera body is conducted as follows: For example, with each data composed of 8 bits, data is arranged to be serially transmitted. Command data is transmitted from the electronic circuit 1 on the side of the camera body to the electronic circuit 10 on the side of the lens. In response to this, the lens side sends data to the camera body side in accordance with the command data. After completion of lens mounting, the electronic circuit 1 on the camera body side sends to the circuit 10 of the lens command data "0A" which is composed of 8 bits and is expressed by hexadecimal notation. At the same time, the camera body side receives invalidity data "00" from the lens side. FIG. 3 shows this state of communication in a timing chart. Concurrently with sending the data "0A", the circuit 1 on the camera body side produces clock pulses to a DCLK signal line for the purpose of synchronizing the communication.

On the side of the lens, the electronic circuit 10 discriminates the meaning of the "0A" and produces data "AA" when the synchronizing clock pulses are produced for a next step of communication. Then, the camera body side sends the invalid data "00" to the lens side. FIG. 4 shows that state of communication in a timing chart.

Upon receipt of the data "AA", the camera body side assumes that normal communication has become possible and causes the electronic circuit 1 on the camera body side to produce a low level voltage from its output terminal. The low level output voltage turns the analog switch 4 on to electrically connect the connection terminal P1 to the positive terminal of the power source 2.

In case that the electronic circuit 1 on the side of the camera body fails to correctly receive the data "AA" because of faulty communication, a high level voltage is produced from the output terminal of the circuit 1 of the camera body to turn the analog switch 4 on. With the analog switch 4 turned on, the connection terminal P1 is disconnected from the power source 2. While the communication is described above to be conducted on the basis of 8 bits data, the number of bits of the data is not limited to 8 bits. The communication between the camera body and the lens is further described as follows:

After completion of lens mounting, the circuit 1 on the side of the camera body sends control signals relative to camera actions (mainly a focusing action) to the circuit 10 on the side of the lens via the lines L5 to L7 and the lines L12 to L14. At the same time, the circuit 10 on the lens side sends to the circuit 1 on the camera body side some signal relative to the motor 9 via the same lines. The timing of this signal exchange is the same as the timing mentioned above. Assuming that the circuit 10 makes the signal level of the line M1 high and that of the line M3 high in response to a control signal from the circuit 1, for example, the transistors T1 and T3 become conductive to allow a current flow in the direction of arrow b to the motor 9 via the line L8 and the transistor T1. This current causes the motor 9 to make forward rotation. The current is then circulated to the negative plate of the power source 2 via the transistor T3, the line L10, the connection terminals P10 and P8 and the line L3.

When a signal for reverse rotation of the motor 9 is sent from the circuit 10 to the circuit 1 via the lines L5 to L7, the circuit 10 produces a low level signal to the line M2 and, at the same time, a high level signal to the line M4. Meanwhile the signal level of the line M1 is high and that of the line M3 is low. The transistors T2 and T4 are then rendered conductive. As a result, the motor 9 is caused to reversely rotate by a current flowing in the direction reverse to the direction of arrow b shown in the drawing.

Figure 2:
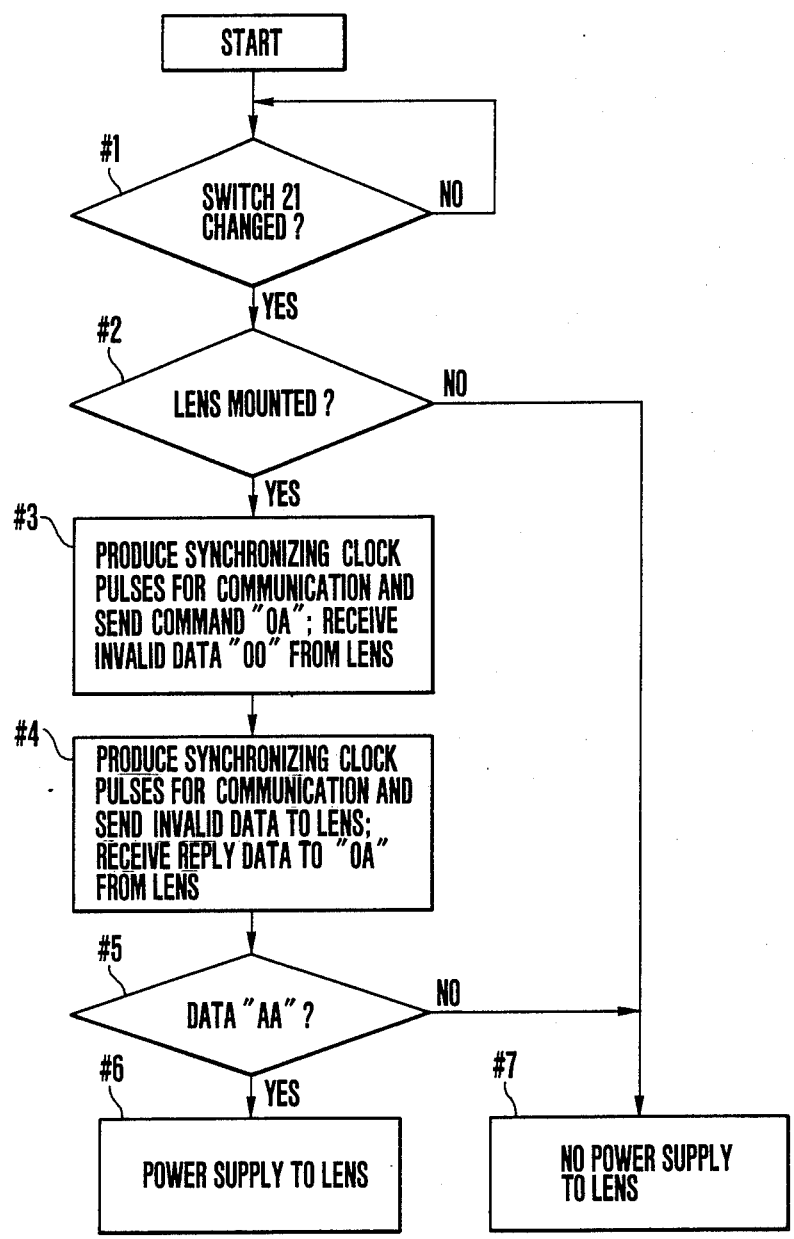
FIG. 2 is a flow chart showing the operation of the first embodiment.

Referring to FIG. 2 which is a flow chart, the circuit operation of the embodiment is as follows: First, at a step #1, a check is made to see if the position of the above stated switch 21 has changed. If not, the operation comes back to a start position. If the switch position is found changed, the operation proceeds to a step #2. At the step #2, a check is made to see if the lens has been completely mounted. This discrimination is made by seeing if the lens mounting detection switch is turned on by the lens mounting dismounting responsive member 7. If so, the operation proceeds to a step #3. If not, no power supply is made from the power source to the connection terminal P1. At the step #3, while a command signal "0A" which is expressed by hexadecimal notation is sent via the connection terminals P5 and P12 while producing the synchronizing clock pulses. At the same time, invalid data "00" is received. At a next step #4, therefore, the camera body side continues to receive data from the lens side via the connection terminals P13 and P6 while producing the clock pulses for synchronization and, at the same time, sends the invalid data to the lens side. At a step #5, a check is made to see if the data received is the hexadecimal notation data "AA". If not, no power supply is effected from the power source 2 to the connection terminal P1 (at a step #7). If so, the operation proceeds to a step #6. At the step #6, a current is supplied to the motor 9 on the lens side from the power source 2 on the camera body side via the connection terminals P1 and P8.

As described above, in accordance with this embodiment, the analog switch which is provided for a power supply to the motor on the lens side is not turned on unless communication comes to be correctly performed between the lens and the camera body. Therefore, the motor can be prevented from doing any faulty action even in case that an erroneous control signal is produced from the motor control circuit as a result of inadequate contact of the communication lines or the power lines of the circuit.

A second embodiment of this invention is arranged as follows: The second embodiment is arranged to be capable of preventing a problem presented by the connector arrangement of the first embodiment. In the case of the connector arrangement of the first embodiment, the current flowing out of the motor 9 is arranged to flow back to the negative plate of the power source 2 via the line L10 and the connection terminal P10 on the lens side and the connection terminal P3 and the line L3 on the side of the camera body in both cases of forward and reverse rotation of the motor 9. The power supply to the motor which is arranged in this manner has some contact resistance between the connection terminals P10 and P3 and there takes place a voltage drop. As a result, there arises a potential difference between the potential of the line L10 on the lens side and that of the line L3 on the camera body side (i.e. the grounding potential of the power source 2). Therefore, the actual grounding potential of the motor 9 becomes considerably higher than that of the power source 2. For example, if the contact resistance between the connection terminals P3 and P10 is one ohm with the current flowing to the motor 9 assumed to be at one ampere, the grounding potential of the motor is one volt instead of zero volt. Meanwhile, in the connector arrangement, the connection terminals on the camera body side and the lens side have flat contact faces. The protruding extent and the spacing pitch of the group of the terminals P1 to P7 and those of the group of terminals P8 to P14 are arranged to be equal to each other. This arrangement tends to have some erroneous contact during the process of mounting the interchangeable lens on the camera body by turning the former round relative to the latter. More specifically, immediately before completion of the mounting process, the connection terminal P2 on the side of the camera body comes into contact with the connection terminal P8 on the side of the lens; and likewise the terminal P3 comes into contact with the terminal P9, the terminal P4 with the terminal P10, the terminal P5 with the terminal P11, the terminal P6 with the terminal P12 and the terminal P7 with the terminal P13 respectively. Then, under this condition, the voltage of 5 V from the constant voltage producing circuit 3 comes via the connection terminal P2 to be applied to the emitters of the PNP transistors T1 and T2. Further, the ground line of the power source 2 is connected to the emitters of the NPN transistors T3 and T4 via the line L4, the terminals P4 and the line L10.

Further, the power terminal of the electronic circuit 10 on the side of the lens is on a power ground line as the terminal P3 is connected to the terminal P9. The ground terminal of the circuit 10 is connected to the signal terminal of the electronic circuit 1 via the terminals P11 and P5. Under this condition, therefore, the circuit 1 is unable to operate in a normal manner and its operation becomes unstable. Although the transistors T1 to T4 of the static switch device are under the control of the lines M1 to M4, the unstable operation of the electronic circuit 1 causes a large current to flow to the PNP transistor T2 and the NPN transistor T3 when the PNP transistor T2 and the NPN transistor T3 are rendered conductive by a low level of the line M2 and the high level of the line M3. The PNP transistor T2 and the NPN transistor T3 tend to be broken by the large current. Then, the PNP transistor T1 and the NPN transistor T4 also might be broken.

Figure 5A:
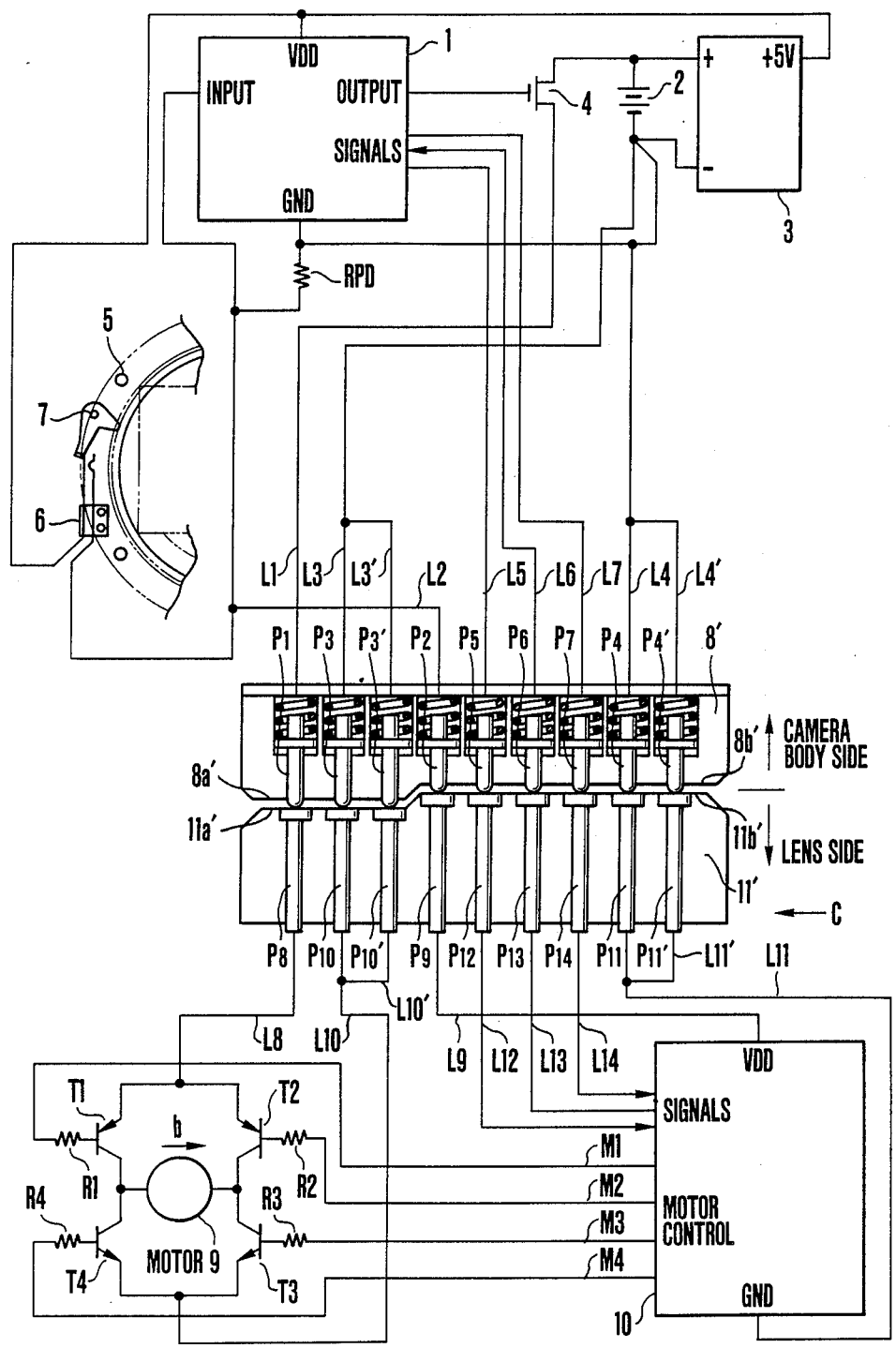
FIG. 5(a) is a diagram showing in outline an electric connection arrangement made between a camera body and an interchangeable lens according to this invention as a second embodiment thereof.
Figure 5B:
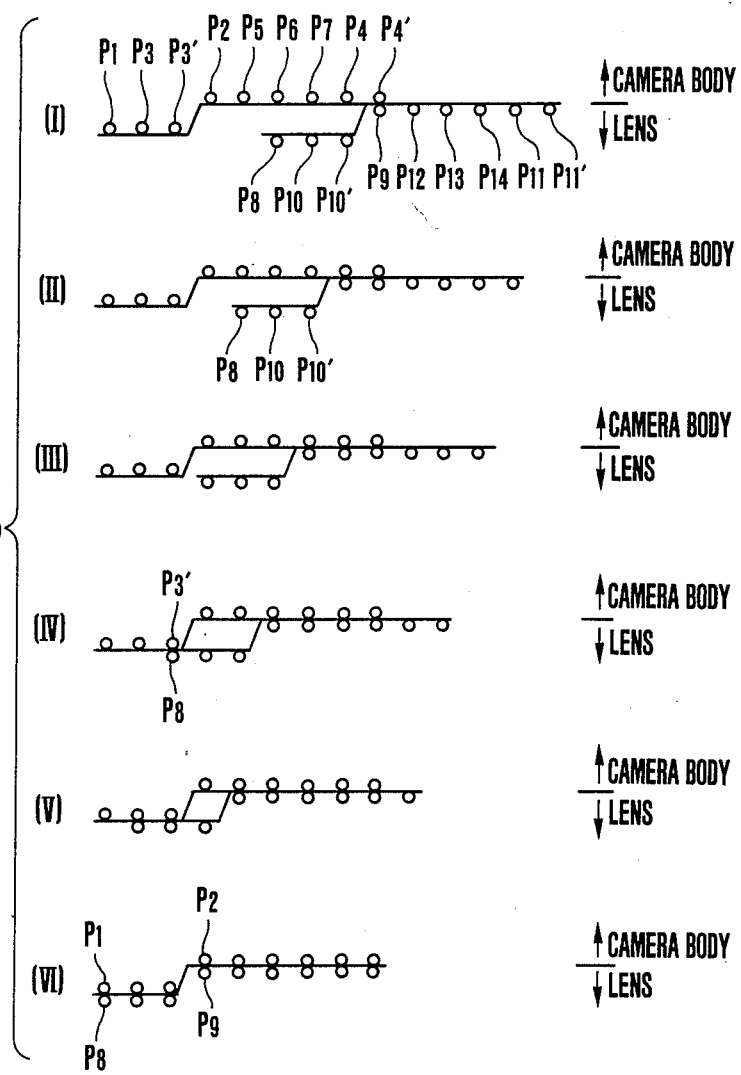
FIG. 5(b) is a schematic illustration of the process of mounting the lens on the camera body by turning the former round relative to the latter.
Figure 6:
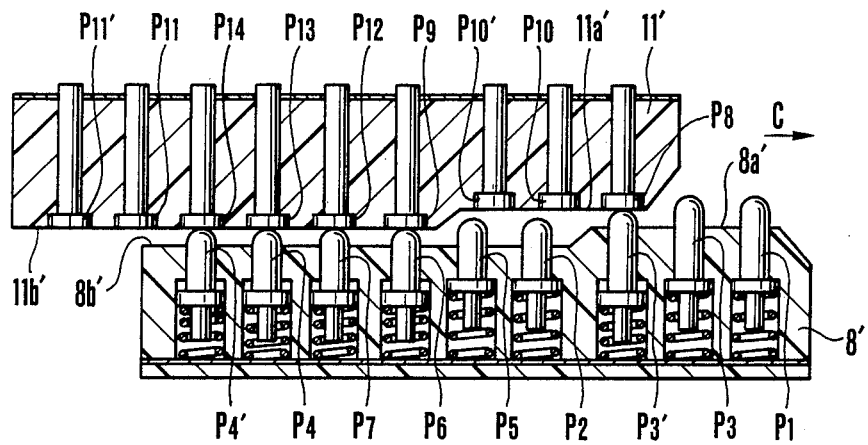
FIG. 6 is a sectional view showing a connector as in a state obtained during the above stated mounting process.
Figure 7:
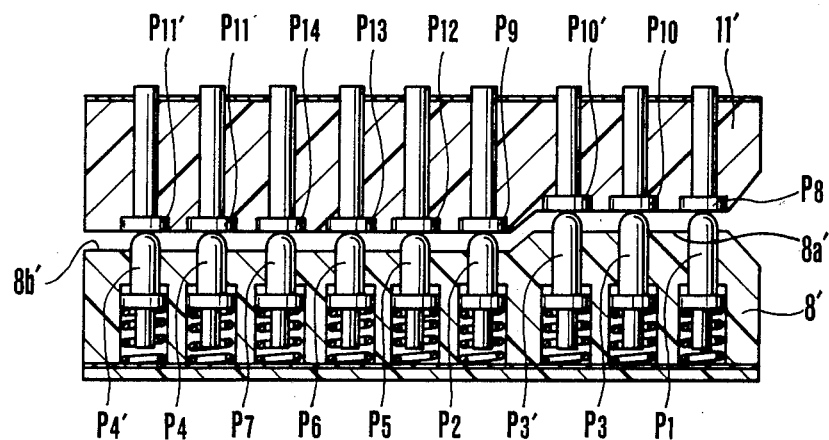
FIG. 7 is a sectional view showing the same connector as in a state obtained after completion of the mounting process.

FIGS. 5(a) to 7 show the second embodiment. The components and parts similar to those of the first embodiment are indicated by the same reference numerals and symbols in these drawings and the details of them are omitted from description. Referring to FIGS. 6 and 7, a connection terminal block 8' on the side of the camera body is provided with a stepped surface consisting of a first face 8a' and a second face 8b'. Meanwhile, a connection terminal block 11' on the side of the lens has also a stepped surface consisting of a first face 11a' and a second face 11b'. The recessed degree of the second face 8b' in reference to the first face 8a' of the terminal block 8' and the protruding degree of the second face 11b' in reference to the first face 11a' of the other terminal block 11' are about equal to each other.

Three connection terminals P1, P3 and P3' are arranged on the first face 8a' of the terminal block 8' which is disposed on the side of the camera body. Six connection terminals P2, P5, P6, P7, P4 and P4' are arranged on the second face 8b'. Meanwhile, three connection terminals P8, P10 and P10' which correspond to the above stated terminals P1, P3 and P3' are arranged on the first face 11a' on the side of the lens. On the second face 11b' are arranged connection terminals P9, P12, P13, P14, P11 and P11' which correspond to the above stated terminals P2, P5, P6, P7, P4 and P4'. The connection terminals on the side of the camera body are urged by springs to be normally in protrudent positions (upward as viewed on FIG. 6) in the direction of an optical axis and are retractable by pushing them. The normal protruding degree of these terminals is arranged to be in such a manner that the tips of the terminals P2, P5, P6, P7, P4 and P4' disposed on the second face 8b' of the connection terminal block 8' are not contacting with the terminals P8, P10 and P10' disposed on the first face 11a' of the connection terminal block 11' on the side of the lens when the lens is turned round for mounting it on the camera body as shown in FIG. 6.

As shown in FIG. 5(a), on the side of the camera body, the connection terminal P1 is connected to the line L1, the terminal P3 to the line L3, the terminal P3' to the line L3' which is connected in parallel to the line L3, the terminal P2 to the line L2, the terminal P5 to the line L5, the terminal P6 to the line L6, the terminal P7 to the line L7, the terminal P4 to the line L4 and the terminal P4' to the line L4' which is connected in parallel to the line L4. Meanwhile, on the side of the lens, the connection terminal P8 is connected to the line L8, the terminal P10 to the line L10, the terminal P10' to the line L10' which is connected in parallel to the line L10, the terminal P9 to the line L9, the terminal P12 to the line L12, the terminal P13 to the line L13, the terminal P14 to the line L14, the terminal P11 to the line L11 and the terminal P11' to the line L11' which is connected in parallel to the line L11.

Further, the connection terminal P3' is arranged to have a cleaning function, though the cleaning function is not directly related to this invention. The terminal P3' is in the same diametral position as other connection terminals P1 and P3 and is in a position to first come into sliding contact with the connection terminal P8 on the lens side when the lens is turned round for mounting it on the camera body. During the process of mounting the lens, the terminal P3' thus acts to remove any foreign matter such as dust from the contact faces of the terminals P8 and P10 by sliding over them. The connection terminal P4' is in the same diametral position as other terminals P2, P6, P7 and P4 and is arranged to likewise perform a cleaning function by first coming into sliding contact with the terminal P9 on the lens side when the lens is turned round for mounting it on the camera body. The terminal P4' is thus arranged also to remove any foreign matter such as dust from the contact faces of the terminals P9, P12, P13 and P11 during the lens mounting process.

The second embodiment which is arranged as described above operates as follows: FIG. 5(b) is a schematic illustration showing the relative positions of the connection terminals which vary as the connection terminal block 11' on the lens side is turned around against the terminal block 8' on the side of the camera body during the lens mounting process as shown in FIG. 6. As shown at a part (I) in FIG. 5(b). The connection terminals P4' on the camera body side and the terminal P9 on the lens side first come into contact with each other. Following that, the group of the connection terminals n the lens side shift to the left as shown at parts (II) and (III) in FIG. 5(b). During this period, however, the terminals P8, P10 and P10' never come into sliding contact with any of the terminals on the lens side. The terminal P8 on the lens side comes into sliding contact first with the terminal P3' on the camera body side at a point as shown at a part (IV) in FIG. 5(b). The positional relation obtained at this point of time is identical with what is shown in FIG. 6. Then, through a state as shown at a part (V) in FIG. 5(b), the positional relation eventually comes to a state as shown at a part (VI) in FIG. 5(b) and also as shown in FIG. 7 when the lens is completely mounted on the camera body. Upon completion of lens mounting, the connection terminals P1, P3, P3', P2, P5, P6, P7, P4 and P4' on the side of the camera body are respectively in touch with the connection terminals P8, P10, P10', P9, P12, P13, P14, P11 and P11' on the side of the lens to obtain required continuity.

In the arrangement described, the connection terminal P1 connected to the line L1 which is a motor power line is arranged to be at a different height from the terminal P2 connected to the line L2 which is a power line for the electronic circuit on the lens side. Meanwhile, the terminal P3 connected to the line L3 which is a power ground line is arranged to be at the same height as the terminal P1. The terminal P4 connected to the line L4 which serves as a signal ground line is arranged to be at the same height as the terminal P2. Therefore, the terminal P2 does not contact with any of the connection terminals on the lens side even in the state as shown at the part (V) in FIG. 5(b). This arrangement prevents the electronic circuit from being broken by the reason as described in the foregoing.

While the connection terminals on the side of the camera body are arranged to be movable in the case of the embodiment described, the same advantageous effect of the invention is attainable by arranging to be movable the connection terminals on the side of the lens to be movable, instead of the terminals on the side of the camera body.

In the second embodiment which relates to a connector arrangement for connecting the electronic circuit of the accessory to the body of an optical apparatus with continuity attained by bringing the connecting terminals of the two into contact with each other, the confronting faces of the connection terminal blocks carrying these terminals are formed in stepped shapes in such a manner as to prevent accidental contact between connection terminals. The embodiment thus effectively prevents the electronic circuit from breaking during the process of turning round the accessory for mounting it on the body of the optical apparatus.

What is claimed is:

1. A camera system having an accessory which is detachably mountable on a camera body having a power source, comprising:

the camera body including an electronic circuit arranged to communicate with said accessory; a first connection terminal arranged to permit a first power supply to said accessory; a second connection terminal arranged to permit a second power supply to said accessory; a third connection terminal arranged to permit communication with said accessory; and means for detecting that said accessory is mounted, and the accessory including a motor arranged to perform a camera action; an electronic circuit arranged to communicate with said camera body and to control rotation of said motor; a first connection terminal arranged to be connected to said first connection terminal on the camera body to permit said first power supply to be effected to said electronic circuit at the accessory when said accessory is mounted; a second connection terminal arranged to be connected to said second connection terminal on the camera body to permit said second power supply to be effected for said motor when said accessory is mounted; and a third connection terminal arranged to be connected to said third connection terminal on the camera body when said accessory is mounted, so that when said accessory is detected to have been mounted on said camera body, said first power supply is effected to said first connection terminal on the camera body for communication between said electronic circuit at the camera body and said electronic circuit at the accessory, and when preset specific digital information is supplied from said electronic circuit of the accessory to said electronic circuit at the camera body, said second power supply is effected to said second connection terminal on the camera body.

2. A system according to claim 1, wherein said accessory is an interchangeable lens.

3. A system according to claim 2, wherein said motor of said accessory rotates and comes to a halt under the control of said electronic circuit of said accessory.

4. A system according to claim 3, wherein said motor of said accessory is used for focusing.

5. An accessory mountable and dismountable on and from a camera body having a power supply device; an electronic circuit; a first connection terminal to permit a first power supply; a second connection terminal to permit a second power supply; a third connection terminal provided for communication between said camera body and said accessory; means for detecting that said accessory is mounted on said camera body; and power supply means arranged to provide said first power supply to said first connection terminal on the camera body when mounting of said accessory is detected by said detecting means and to provide said second power supply to said second connection terminal on the camera body when preset specific digital information is supplied via said third connection terminal on the camera body to said electronic circuit at the camera body after said first power supply is effected, said accessory comprising:

(a) a motor for carrying out a camera action;
   (b) an electronic circuit arranged to communicate with said electronic circuit in the camera body by receiving said first power supply and to supply said preset specific digital information to said electronic circuit in the camera body, said electronic circuit in said accessory being arranged to control rotation of said motor;
   (c) a first connection terminal arranged to be connected to said first connection terminal on the camera body when said accessory is mounted to said camera body and to permit said first power supply to said electronic circuit in the accessory when said first connection terminal on the camera body permits said first power supply;
   (d) a second connection terminal arranged to be connected to said second connection terminal on the camera body when said accessory is mounted on said camera body and to permit said second power supply for said motor when said second connection terminal on the camera body permits said second power supply; and
   (e) a third connection terminal arranged to be connected to said third connection terminal on the camera body and thus to permit communication between said electronic circuits in said camera body and said accessory when said accessory is mounted on said camera body.

6. An accessory according to claim 5, wherein said accessory is an interchangeable lens.

7. An accessory according to claim 6, wherein said motor of said accessory is used for focusing.

8. An accessory according to claim 5, wherein at least said first connection terminal on the accessory and said second connection terminal on the accessory are arranged in positions deviating from each other in a contacting direction.

9. An accessory according to claim 8, wherein at least said first and third connection terminals on the accessory are arranged at the same height with respect to the contacting direction.

10. A camera system having an accessory arranged to be mountable and dismountable on and from a camera body, said camera system comprising:

the camera body having an electronic circuit arranged to communicate with said accessory; a first connection terminal arranged to permit a first power supply to said accessory; a second connection terminal arranged to permit a second power supply to said accessory; and a third connection terminal arranged to permit communication between said camera body and said accessory, and the accessory having a motor to cause camera actions to be carried out; an electronic circuit arranged to communicate with the camera body; a first connection terminal arranged to be connected to said first connection terminal on that camera body when said accessory is mounted on said camera body and thus to permit said first power supply to said electronic circuit at the accessory; a second connection terminal arranged to be connected to said second connection terminal on the camera body when said accessory is mounted on said camera body and thus to permit said second power supply for said motor; and a third connection terminal arranged to be connected to said third connection terminal on the camera body when said accessory is mounted on said camera body;

wherein said plurality of connection terminals on the camera body and said plurality of connection terminals on the accessory are formed in shapes which approximately coincide with a direction in which said accessory moves when mounting said accessory on said camera body; and at least said first connection terminals and said second connection terminals are arranged in positions deviating from each other in a contacting direction.

11. A system according to claim 9, wherein said accessory is an interchangeable lens, which is arranged to be mounted by rotating.

12. An accessory mountable and dismountable on and from a camera body having a power source; an electronic circuit; a first connection terminal arranged to permit a first power supply; a second connection terminal arranged to permit a second power supply; and a third connection terminal arranged to permit communication with said accessory, said first, second and third connection terminals on the camera body being arranged in a row in a direction almost coinciding with a direction in which said accessory moves when mounting it on said camera body, with at least said first and second connection terminals on the camera body being arranged in positions deviating from each other in a contacting direction, said accessory comprising:

a motor for causing camera actions to be carried out;
an electronic circuit arranged to communicate with said electronic circuit disposed at the camera body;
a first connection terminal arranged to be connected to said first connection terminal on the camera body when said accessory is mounted and thus to permit said first power supply to said electronic circuit on the accessory; and
a second connection terminal arranged to be connected to said second connection terminal on the camera body when said accessory is mounted on said camera body and thus to permit said second power supply for said motor,
wherein said first and second connection terminals on the accessory are positioned to correspond to the positions of said first and second connection terminals on the camera body and are set in positions deviating from each other in a contacting direction.

13. An accessory according to claim 12, wherein said accessory is an interchangeable lens.

14. An accessory according to claim 13, wherein said motor of said accessory is used for focusing.

15. An accessory according to claim 11, wherein said first and third connection terminals on the accessory are arranged at the same height with respect to the contacting direction.

16. An accessory according to claim 12, wherein upon mounting said accessory onto said camera body, said second connection terminal on the accessory is at a height in the contacting direction of said second connection terminal on the accessory so as to be out of contact with said first connection terminal on the camera body.

17. An accessory according to claim 12, wherein said first, second and third connection terminals on the accessory are fixed to a connection terminal block having a face that is deviated in the contacting direction so as to arrange contacting portions of said connection terminals and said face of said connection terminal block at substantially the same height.

18. A camera body mountable and dismountable on and from an accessory, said camera body comprising:
a power source;
an electronic circuit for communication with said accessory;
a first connection terminal to permit a first power supply to said accessory;
a second connection terminal to permit a second power supply to said accessory; and
a third connection terminal to permit communication between said camera body and said accessory,
wherein at least said first connection terminal and said second connection terminal are arranged in positions deviating from each other in a contacting direction.

19. A camera body according to claim 18, wherein said first and third connection terminals are arranged at the same height with respect to the contacting direction.

20. An accessory mountable and dismountable on and from a camera body having a power source, said accessory comprising:
a first connection terminal to permit a first power supply from said camera body;
a second connection terminal to permit a second power supply from said camera body; and
a third connection terminal to permit communication between said camera body and said accessory;
wherein said second connection terminal is deviated with respect to a contacting said first and third connection terminals.

21. An accessory according to claim 20, wherein said first, second and third connection terminals on the accessory side are fixed to a connection terminal block having a face that is deviated in the contacting direction so as to arrange contacting portions of said connection terminals and said face of said connection terminal block at substantially the same height.

22. An accessory according to claim 20, further comprising:
a motor for causing camera action to be carried out;
an electronic circuit arranged to communicate with said camera body;
said motor being driven by said second power supply provided by said second connection terminal and said electronic circuit operating with said first power supply provided by said first connection terminal.

23. A camera body mountable and dismountable on and from an accessory, said camera body comprising:

an electronic circuit for communication with said accessory;

first connection terminals to permit a first power supply to said accessory;

second connection terminals to permit a second power supply to said accessory;

third connection terminals to permit communication between said camera body and said accessory;

means for detecting that said accessory is mounted; and power supply means arranged to provide the first power supply to said first connection terminals and the second power supply to said second connection terminals, wherein at least said first connection terminals and said second connection terminals are arranged in positions deviating in a contacting direction.

24. A camera body according to claim 23, wherein said power supply means first provides said first power supply and thereafter said second power supply.

25. A camera body according to claim 24, wherein said first and third connection terminals are arranged at the same height with respect to the contacting direction.

26. A camera body according to claim 23, wherein the contacting direction is the direction of the optical axis.

27. A camera body according to claim 23, wherein said second connection terminals include at least two connection terminals connected in parallel.

28. An accessory mountable and dismountable on and from a camera body having a power source, said accessory comprising:

first connection terminals to permit a first power supply from said camera body;

second connection terminals to permit a second power supply from said camera body;

third connection terminals to permit communication between said accessory and said camera body;

a motor arranged to perform a camera action;

an electronic circuit arranged to communicate with said camera body; and power supply means arranged to provide the first power supply of said first connection terminals to said electronic circuit and the second power supply of said second connection terminals to said motor, wherein at least said first connection terminals and said second terminals are arranged in positions deviating in a contacting direction.

29. An accessory according to claim 28, wherein said first and third connection terminals are arranged at the same height with respect to the contacting direction.

30. An accessory according to claim 28, wherein the contacting direction is the direction of the optical axis.

31. An accessory according to claim 30, wherein said first connection terminals are projected in said optical axis direction beyond said second connection terminals.

32. An accessory according to claim 28, wherein said first connection terminals are projected in the contacting direction beyond said second connection terminals.

33. An accessory according to claim 31, wherein said connection terminals are fixed to a connection terminal block having a face so as to arrange contacting portions of said connection terminals and said face of said connection terminal block at substantially the same height.

34. An accessory according to claim 32, wherein said connection terminals are fixed to a connection terminal block having a face so as to arrange contacting portions of said connection terminals and said face of said connection terminal block at substantially the same height.

35. An accessory according to claim 28, wherein said third connection terminals are arranged between said first connection terminals.

36. An accessory according to claim 35, wherein said first connection terminals and said third connection terminals are supported at almost the same height relative to the contacting direction.

37. An accessory according to claim 35, wherein said connection terminals are fixed to a connection terminal block having a face so as to arrange contacting portions of said connection terminals and said face of said connection terminal block at substantially the same height.

38. An accessory according to claim 28, wherein at least one of said first connection terminals is arranged adjacent at least to one of said second connection terminals.

39. An accessory according to claim 38, wherein said connection terminals are fixed to a connection terminal block having a face so as to arrange contacting portions of said connection terminals and said face of said connection terminal block at substantially the same height.

40. An accessory according to claim 38, wherein said adjacent two connection terminals are a high potential terminal and a ground terminal, respectively.

41. An accessory according to claim 40, wherein said connection terminals are fixed to a connection terminal block having a face so as to arrange contacting portions of said connection terminals and said face of said connection terminal block at substantially the same height.

* * * * *

UNITED STATES PATENT AND TRADEMARK OFFICE
CERTIFICATE OF CORRECTION

PATENT NO. : 4,924,249
DATED : May 8, 1990
INVENTOR(S) : AIHARA, ET AL.

It is certified that error appears in the above-identified patent and that said Letters Patent is hereby corrected as shown below:

TITLE PAGE:
AT [56] References Cited:

"4,457,609 3/1984 Tomino et al." should read --4,457,609 7/1984 Tomino et al.--

COLUMN 1

Line 34, "includes" should read --include--.
Line 60, "is" should read --are--.

COLUMN 2

Line 39, "because:" should read --because--.

COLUMN 3

Line 23, "follows:" should read --follows.--.

COLUMN 4

Line 29, "electronic circuit 1." should read --electronic circuit 1--.

COLUMN 5

Line 44, "circuit 10" should read --circuit 10.--.

COLUMN 7

Line 61, "mounting dismounting" should read --mounting-dismounting--.
Line 63, "power source" should read --power source 2--.
Line 64, "while" should be deleted.

UNITED STATES PATENT AND TRADEMARK OFFICE
CERTIFICATE OF CORRECTION

PATENT NO.  : 4,924,249

DATED       : May 8, 1990

INVENTOR(S) : AIHARA, ET AL.

Page 2 of 2

It is certified that error appears in the above-identified patent and that said Letters Patent is hereby corrected as shown below:

COLUMN 10

Line 35, "FIG. 5(b). The" should read --FIG. 5(b), the--.
Line 36, "terminals P4'" should read --terminal P4--.
Line 39, "n" should read --on--.

COLUMN 13

Line 9,  "that" should read --the--.
Line 30, "claim 9," should read --claim 10,--.

COLUMN 14:

Line 1,  "claim 11," should read --claim 12,--.
Line 48, "a contacting" should be deleted.

Signed and Sealed this

Twenty-fifth Day of August, 1992

Attest:

DOUGLAS B. COMER

Attesting Officer

Acting Commissioner of Patents and Trademarks